(12) United States Patent
Oberdier et al.

(10) Patent No.: US 7,523,671 B2
(45) Date of Patent: Apr. 28, 2009

(54) APPARATUS, SYSTEM AND METHOD FOR MEASURING STRESS

(75) Inventors: Larry M. Oberdier, Royal Oak, MI (US); Bruno Lequesne, Troy, MI (US); Elias Taye, Macomb Township, MI (US); Thaddeus Schroeder, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 155 days.

(21) Appl. No.: 11/713,961

(22) Filed: Mar. 5, 2007

(65) Prior Publication Data

US 2008/0216582 A1      Sep. 11, 2008

(51) Int. Cl.
  *G01L 1/00*  (2006.01)
  *G01L 1/12*  (2006.01)
(52) U.S. Cl. .................................... 73/779; 73/862.626
(58) Field of Classification Search ................ 73/774, 73/779, 862.381, 862.621, 862.625, 862.626
See application file for complete search history.

(56) References Cited

U.S. PATENT DOCUMENTS

| | | | | |
|---|---|---|---|---|
| 4,835,509 A | * | 5/1989 | Yoshino et al. | 338/32 R |
| 6,057,167 A | * | 5/2000 | Shieh et al. | 436/526 |
| 2007/0107528 A1 | * | 5/2007 | Schroeder et al. | 73/779 |

* cited by examiner

*Primary Examiner*—Harshad Patel
*Assistant Examiner*—Punam Patel
(74) *Attorney, Agent, or Firm*—Thomas N. Twomey (57) ABSTRACT

A system for measuring stress including a coilless sensor including at least one band of electrically conductive and magnetostrictive material, the band having a first end and a second end defining a gap therebetween, a measuring circuit electrically connected to the first and second ends of the coilless sensor, the measuring circuit being configured to pass a current through the coilless sensor and measure at least one of an inductance, a resistance and an impedance of the coilless sensor in response to the current, and a processor in electrical communication with the measuring circuit, the processor being configured to calculate an amount of stress being applied to the coilless sensor based upon the measured inductance, resistance and impedance.

18 Claims, 5 Drawing Sheets

APPARATUS, SYSTEM AND METHOD FOR MEASURING STRESS

BACKGROUND

The present application is directed to stress sensors and, more particularly, to apparatus, systems and methods for measuring stress.

Stress sensors may be used to measure an amount of force, torque or pressure applied to a material. Traditional stress sensors have employed a conductive wire coil that is wrapped around a separate core member. The core member is formed from a magnetostrictive material. An electrical current flowing through the wire coil establishes a magnetic field that surrounds the wire coil and propagates into the core member. A stress applied to the core member changes the magnetic permeability of the core member. The inductance of the wire coil is a function of the permeability of the material through which the coil member's magnetic field flows. Therefore, the stress applied to the core member changes the inductance of the wire coil and the change in inductance may be correlated into a measured force value.

U.S. Ser. No. 11/244,792, filed on Oct. 6, 2005, the entire contents of which are incorporated herein by reference, discloses a stress sensor in which the wire coil and core member have been functionally combined as a coilless sensor. The coilless sensor includes an electrically conductive member comprising a magnetostrictive material that is configured to receive an applied force, wherein the electrically conductive member has a change in impedance in response to the applied force. The coilless sensor further includes first and second covering members such that the electrically conductive member may be disposed between the first and second covering members. The second covering member has first and second apertures extending therethrough. The coilless sensor further includes first and second electrical terminals disposed through the first and second apertures, respectively, of the second covering member that are coupled to the electrically conductive member. The coilless sensor has increased sensitivity for measuring forces and provides more consistent force measurements since manufacturing tolerances associated with the air gap between various elements of the core member have been eliminated.

However, there remains a need for a coilless stress sensor and associated system having improved functionality and design flexibility. There is also a need for a coilless stress sensor capable of being used in an electric motor-operated brake caliper assembly.

SUMMARY

In one aspect, the disclosed system for measuring stress may include a coilless sensor including at least one band of conductive and magnetostrictive material, the band having a first end and a second end defining a gap therebetween, a measuring circuit electrically connected to the first and second ends of the coilless sensor, the measuring circuit being configured to pass a current through the coilless sensor and measure at least one of an inductance, a resistance and an impedance of the coilless sensor in response to the current, and a processor in electrical communication with the measuring circuit, the processor being configured to calculate an amount of stress being applied to the coilless sensor based upon the measured inductance, resistance and impedance.

In another aspect, the disclosed coilless sensor may include a band formed from an electrically conductive and magnetostrictive material, the band including a first end and a second end, wherein the band is shaped as an open ring and defines a gap between the first and second ends, a first terminal connected to the first end of the band, and a second terminal connected to the second end of the band.

In another aspect, the disclosed method for measuring stress may include the steps of providing a coilless sensor including a band formed from an electrically conductive and magnetostrictive material, the band including a first end and a second end, shaping the band such that a gap defined by the first and second ends has a length that is less than a length of the band, passing an electric current through the coilless sensor, measuring at least one of an inductance, a resistance and an impedance of the coilless sensor in response to the electric current, and correlating the measured inductance, resistance and impedance into an amount of stain being applied to the coilless sensor.

Other aspects of the disclosed apparatus, system and method for measuring stress will become apparent from the following description, the accompanying drawings and the appended claims.

DETAILED DESCRIPTION

Figure 1:
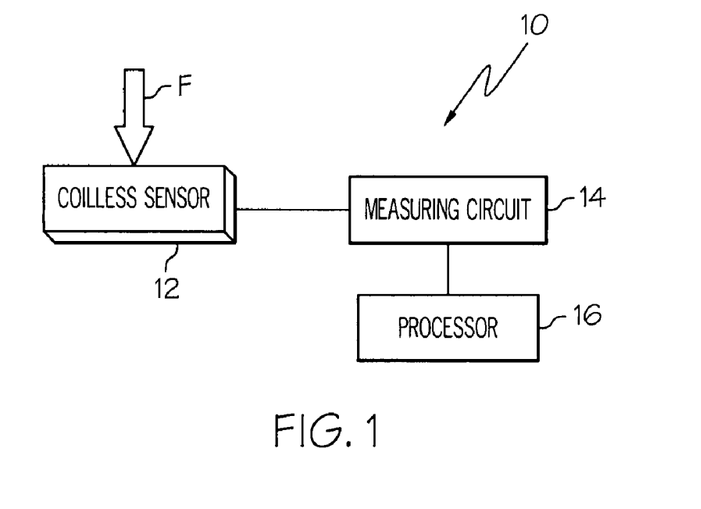
FIG. 1 is a block diagram of one aspect of the disclosed stress measuring system including a sensor, a measuring circuit and a processor.

Referring to FIG. 1, one aspect of the disclosed system for measuring stress, generally designated 10, may include a coilless sensor 12, a measuring circuit 14 and a processor 16. When a force F is applied to the coilless sensor 12, the change in electrical properties of the sensor 12 may be measured by the measuring circuit 14 and communicated to the processor 16. The processor 16 may process the measured electrical properties to determine the amount of force F being applied to the sensor 12.

Figures 2A, 2B:
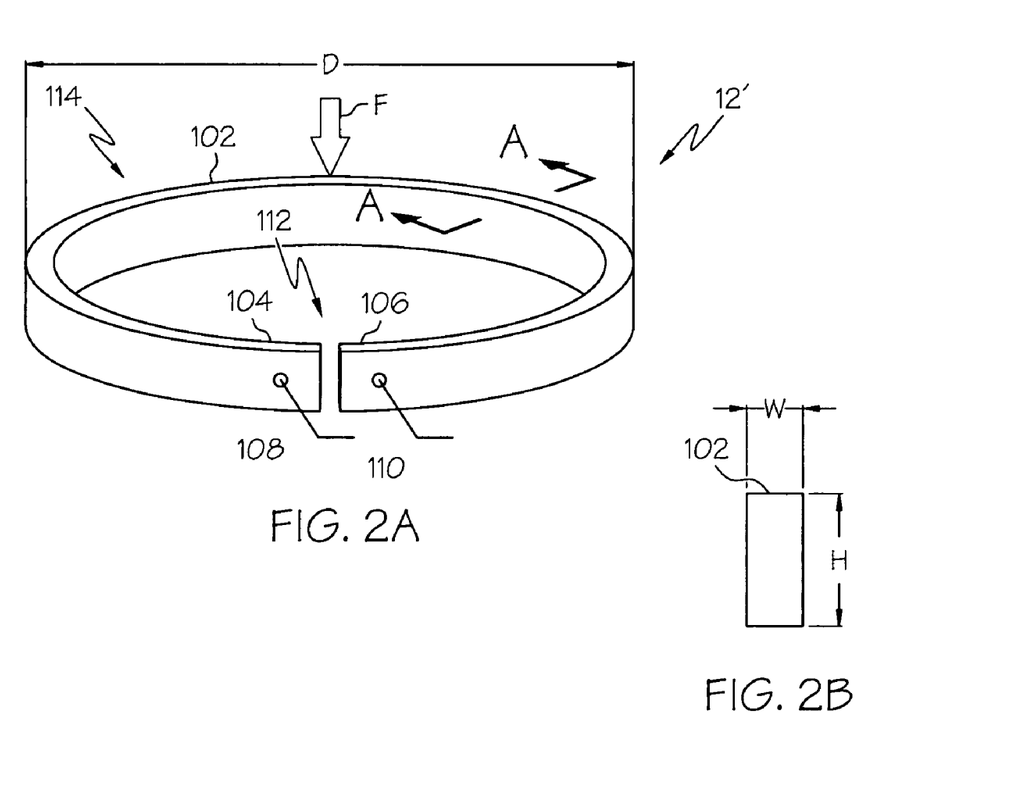
FIG. 2A is a front perspective view of a first aspect of the sensor of FIG. 1.
FIG. 2B is a cross-sectional view of the sensor of FIG. 2A taken at plane A-A.

In one aspect, as shown in FIG. 2A, a coilless sensor 12' may include an elongated band 102 having a first end 104 and a second end 106. A first terminal 108 may be connected to the first end 104 of the band 102 and a second terminal 110 may be connected to the second end 106 of the band 102 to connect the sensor 12' to the measuring circuit 14. The terminals 108, 110 may be connected to the band 102 by, for example, soldering or any other available techniques.

The band 102 may be formed into a generally open ring 114 and the first and second ends 104, 106 of the band 102 may be separated by a gap 112. The ring 114 may be generally round or oval-shaped in top view and may have a diameter D. In one aspect, the band 102 may form about 270 to about 355 degrees of the ring 114 and the gap 112 may form the rest of the ring 114. In another aspect, the band 102 may form about 90 to about 359 degrees of the ring 114 and the gap 112 may form the rest of the ring 114.

Referring to FIG. 2B, the band 102 may have a generally rectangular cross-section having a height H and a width W, wherein the height H is greater than the width W. In one aspect, the cross-section of the band 102 may have an aspect ratio (i.e., the ratio of the height H to the width W) of about 1 to about 10. Those skilled in the art will appreciate that the height H, width W, diameter D and gap 112 of the ring 114 may be selected based upon design considerations. For example, a sensor 12' may have an average diameter D of about 50 mm, a height H of about 5 mm, a width W of about 2 mm and a gap 112 of about 2 mm.

The band 102 may be formed from an electrically conductive and magnetostrictive material. For example, the band 102 may be formed from a magnetostrictive material such as cobalt, iron, nickel, rare-earth elements having magnetostrictive properties and alloys and combinations thereof. In one aspect, the band 102 of the sensor 12' is formed from a nickel/iron alloy.

The force F being measured may be applied to a portion of the band 102, or to the entire surface of band 102. Alternatively, the force F may be applied partially through the band 102 and partially through a parallel, non-sensing member (not shown in FIG. 2). All three cases are contemplated by the present disclosure. However, applying the force F to a portion of the band 102 results in the sensor being larger than necessary. Also, having the force F applied partially through the band 102 and partially through a parallel, non-sensing member may be attractive in cases where the force F is large, so as to keep the size of the sensor small. However, in that situation, the sensor reading will be an accurate image of the entire force only if there is a consistent and repeatable relation between the portion of the force F being sensed and the entire force F. Overall, therefore, with the exception of designs for large forces, the most desirable approach may be the one where the force F is exerted over approximately the entire surface of the band. To achieve this, the practitioner will design the shape of the band 102 (generally round, oval, or for that matter any other shape) to match the shape and cross-sectional dimensions of the force-transmitting member, so that the band surface corresponds to the footprint of the force F.

Figures 3A, 3B:
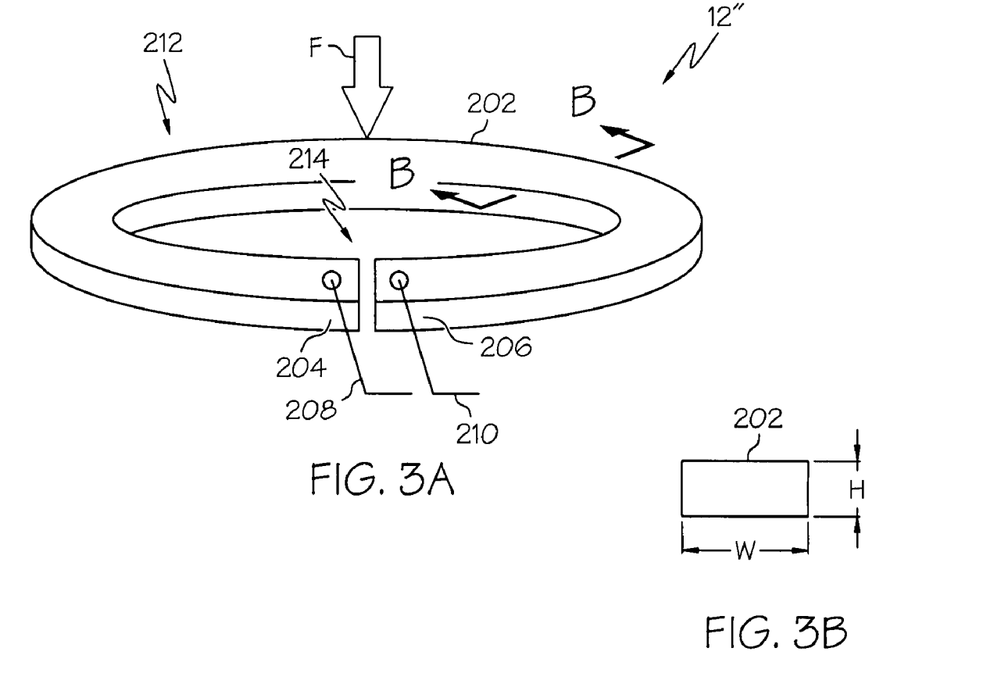
FIG. 3A is a front perspective view of a second aspect of the sensor of FIG. 1.
FIG. 3B is a cross-sectional view of the sensor of FIG. 3A taken at plane B-B.

In another aspect, as shown in FIG. 3A, the coilless sensor 12" may include an elongated band 202 having a first end 204 and a second end 206. As discussed above, terminals 208, 210 may be connected to the first and second ends 204, 206, respectively, of the band 202. The band 202 may be formed into a generally open washer-shaped ring 112 having a gap 214.

Referring to FIG. 3B, the band 202 may have a generally rectangular cross-section having a height H and a width W, wherein the width W is greater than the height H. In one aspect, the cross-section of the band 202 may have an aspect ratio (i.e., the ratio of the height H to the width W) of about 0.1 to about 1. For example, a sensor 12" may have an average diameter D of about 50 mm, a height H of about 2 mm, a width W of about 5 mm and a gap 214 of about 2 mm.

In another aspect, multiple bands 102, 202 may be stacked together, either in series or parallel, to provide an overall sensor 12, as discussed below.

Figure 4A:
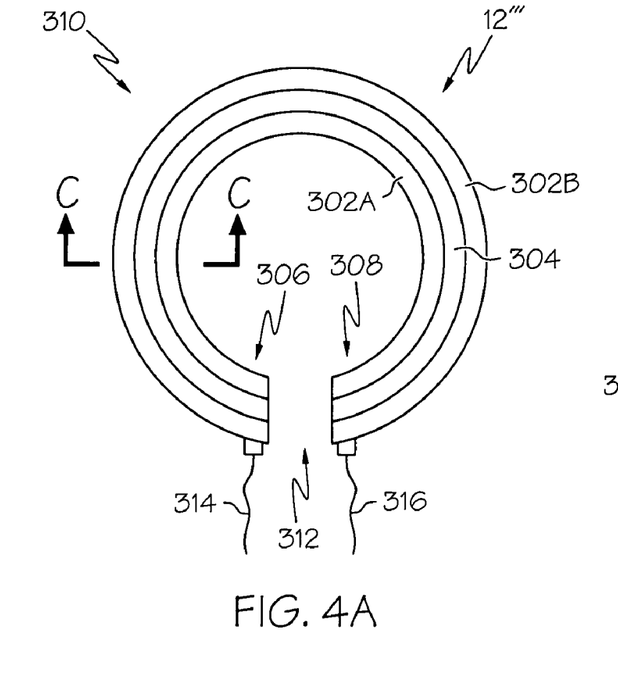
FIG. 4A is a top plan view of a third aspect of the sensor of FIG. 1.
Figure 4B:
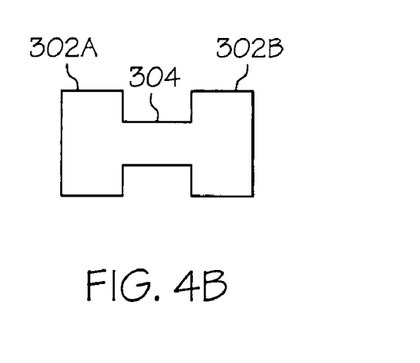
FIG. 4B is a cross-sectional view of the sensor of FIG. 4A taken at plane C-C.

For example, as shown in FIGS. 4A, 4B, a coilless sensor 12''' may include two bands 302A, 302B connected to each other by a bridge portion 304. The bands 302A, 302B may be formed into a concentric open ring 310 having a first end 306 and a second end 308 separated by a gap 312. A first terminal 314 may be connected to the first end 306 and a second terminal 316 may be connected to the second end 308 to connect the sensor 12''' to the measuring circuit 14. Therefore, sensor 12''' effectively includes two bands 302A, 302B connected in parallel.

Figure 5A:
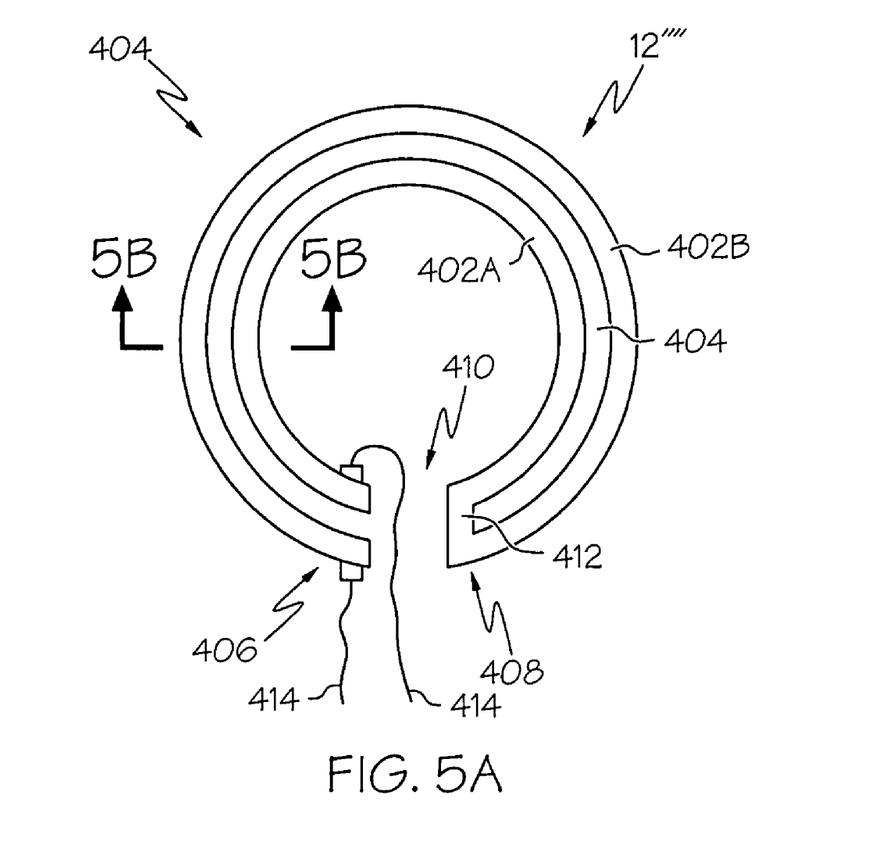
FIG. 5A is a top plan view of a fourth aspect of the sensor of FIG. 1.
Figure 5B:
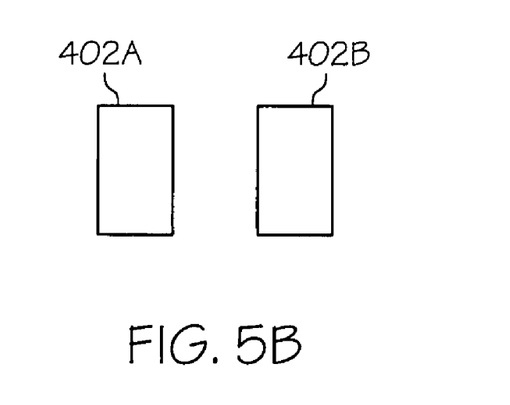
FIG. 5B is a cross-sectional view of the sensor of FIG. 5A taken at plane D-D.

Alternatively, as shown in FIGS. 5A, 5B, a coilless sensor 12'''' may include two bands 402A, 402B formed into a concentric open ring 404 having a first end 406 and a second end 408 separated by a gap 410. A bridge portion 412 (FIG. 5A) may be positioned between the two bands 402A, 402B at the second end 408 of the ring 404. A first terminal 414 may be connected to the first end 406 of the first band 402B and a second terminal 416 may be connected to the first end 406 of the second band 402A to connect the sensor 12'''' to the measuring circuit 14. Therefore, sensor 12'''' of FIGS. 5A, 5B effectively includes two bands 402A, 402B connected in series.

At this point, those skilled in the art will appreciate that the coilless sensors 12 of the disclosed stress measuring system 10 may have various shapes, dimensions and sizes, preferably but not necessarily matching the footprint of the stress being measured, and may be formed from various electrically conductive and magnetostrictive materials having various rectilinear or curvilinear shapes, the selection of which may be driven by cost, design and manufacturing considerations.

It should be noted that coilless sensors 12 disclosed herein may be used to measure an amount of stress applied to a material and/or to measure the amount of force, torque and/or pressure that affects the stress level in a material. However, those skilled in the art will appreciate that coilless sensors 12 may be used to measure any physical quantity that can be determined from an applied stress to the sensor.

As shown in FIGS. 2A and 3A, the force F applied to the sensors 12', 12" is in a direction substantially perpendicular to a direction of the electrical current flowing through the sensors. However, it should be noted that depending on the design and application of the sensor 12, including the overall shape of the sensor 12 and the materials used to form the sensor 12, the stress may be in-line, perpendicular or at any angle with respect to a direction of the electrical current flowing through the sensor 12.

Accordingly, referring again to FIG. 1, when an electric current is supplied to the coilless sensor 12 by the measuring circuit 14, the current establishes a magnetic field (not shown) around the sensor 12 in a path transverse to the current flow. As a force F is applied to the sensor 12, its magnetic permeability changes due to imposed stress, thereby affecting the measured inductance. Furthermore, at higher frequencies and because of skin effects, the effective resistance of the sensor 12 is also a function of magnetic permeability. Therefore, the stress applied to the sensor 12 may be a function of, or otherwise correlated to, the amount of inductance, resistance and/or impedance of the sensor 12.

Accordingly, by measuring and processing the electrical signals (e.g., inductance, resistance and/or impedance) received from the coilless sensor 12 in response to the introduced current, the system 10 may determine the amount of force F being applied to the coilless sensor 12.

Figure 6:
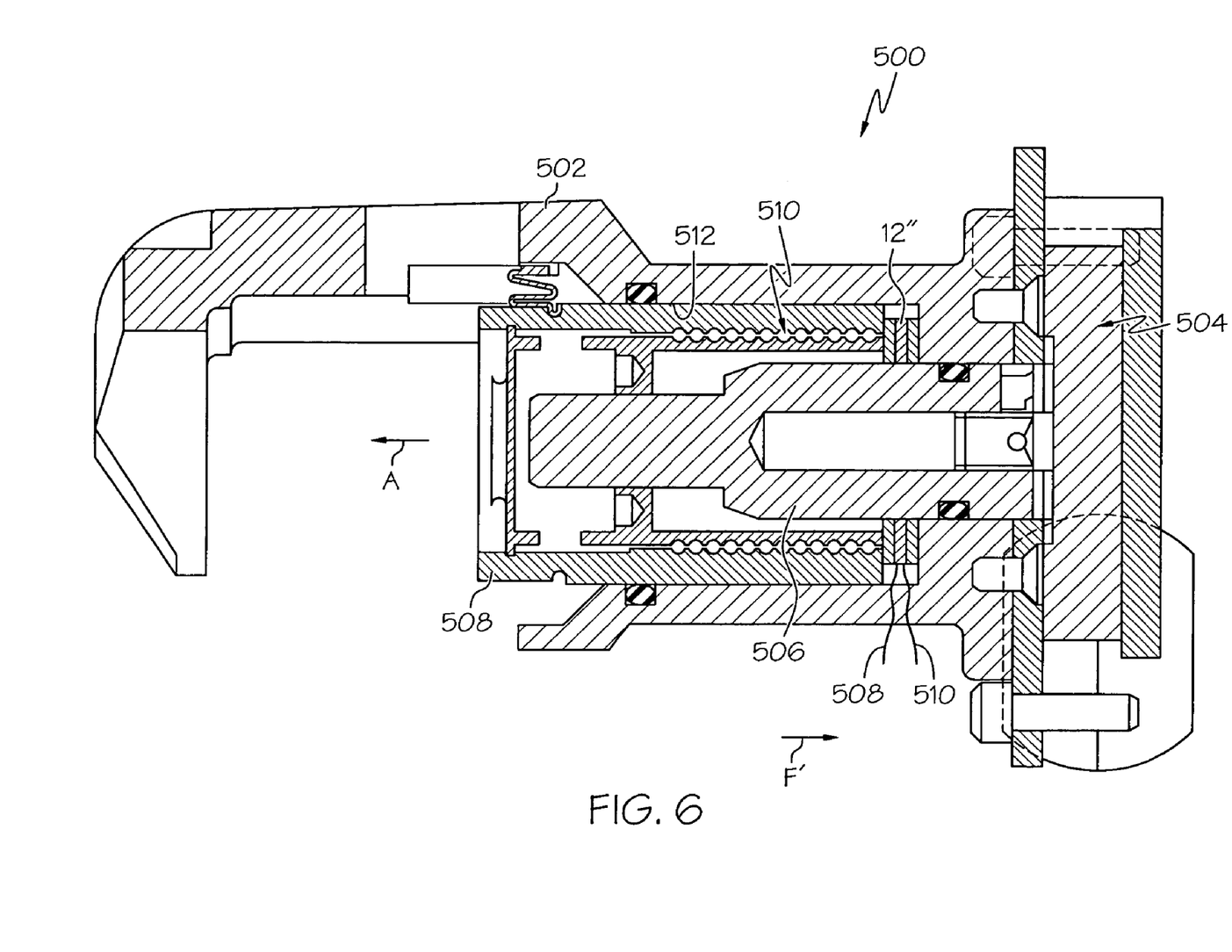
FIG. 6 is a side elevational view, in section, of an electric brake caliper assembly including the sensor of FIG. 3.

Referring to FIG. 6, an electric brake caliper assembly, generally designated 500, may be provided with a coilless sensor 12 of the present disclosure to measure the amount of braking force being applied to a rotor (not shown) by the brake caliper assembly 500. In one aspect, the assembly 500 may include a caliper housing 502, an electric motor assembly 504 having a drive shaft 506 extending therefrom, a caliper 508 and a ballnut/ball screw assembly 510. The caliper housing 502 may include a central bore 512 extending therethrough and the caliper 508 may be slidably received within the bore 512. Rotational power from the motor 504 may be communicated to the ball screw assembly 510 by the shaft 506 (possibly via a gear, not shown), and the ballnut/ball screw assembly 510 may convert the rotational power of the motor 504 into distal advancement (arrow A) of the caliper 508 through the bore 512. A coilless sensor 12 (e.g., a washer-shaped coilless sensor 12" of FIG. 3A) having terminals 208, 210 connected to a measuring circuit 14 (FIG. 1) may be positioned between the caliper 508 and the ballnut/ball screw assembly 510, on the one hand, and the caliper housing 502, on the other hand, to sense the reaction force (arrow F') generated when the caliper 508 is being driven into engagement with the brake pads (not shown) and rotor (not shown).

Those skilled in the art will appreciate that the ring shape of the coilless sensor 12" corresponds with the generally cylindrical shape of the caliper 508, thereby occupying less space within the caliper housing 502, while sensing the full reaction force (except for the small gap 214) being applied to the caliper housing 502 by the caliper 508. In other words, the ring shape of the coilless sensor 12" generally matches the footprint of the reaction force F'. This is an advantage in brake systems, because although the reaction force F' may be uniformly distributed at low braking levels, it may not be so at higher braking levels when the caliper assembly may become distorted. A sensor that would sense only a portion of the force may thus provide an inaccurate measure of the force.

While suggestion has been made to use the disclosed coilless sensors 12 in an electric brake caliper assembly 500 (FIG. 6), those skilled in the art will appreciate that the disclosed coilless sensor 12 may be used in a wide variety of applications and the overall size and shape of the sensor 12 may be dictated by the application, intended use and/or desired result.

Referring again to FIG. 1, the measuring circuit 14 may supply an electric current to the coilless sensor 12 and may measure the inductance, resistance and/or impedance in the coilless sensor 12 in response to the electric current. The measured inductance, resistance and/or impedance in the coilless sensor 12 may in turn be communicated to the processor 16.

The coilless structure of coilless sensor 12 may result in low inductance levels, which may be difficult to measure by the measuring circuit 14. For example, a single ring coilless sensor 12 formed from a nickel-iron alloy and having diameter D on the order of 50 mm, a width W of about 2 mm and a height H of about 2 mm may have an inductance of about 1.5 micro-Henries ($\mu H$) at 10 kilohertz (kHz). If two such rings are placed in series, as shown in FIG. 5B, the inductance may be about 3 $\mu H$.

Therefore, one potential challenge presented by the coilless sensor 12 is the low voltage signals generated by such small inductance values. For example, a 3 $\mu H$ inductance at 10 kHz is a 0.19 Ohm ($\Omega$) impedance. If the coilless sensor 12 is excited with a 1 milliamp (mA) current, the resulting voltage is about 0.19 millivolts (mV). Therefore, even a 20 percent change in inductance as a result of stress measures in the 40 microvolt ($\mu V$) range.

Another challenge results from the possibility that the impedance of the connection between the sensor 12 and the measuring circuit 14 may not be small compared with the impedance of the sensor 12. While it may be possible to minimize the length of the connection between the sensor 12 and the circuit 14, the signal may remain smaller since only the inductance of the sensor 12 is affected by stress. Similarly, temperature compensation schemes which are based on sensing the sensor resistance will be complicated by the resistance of the leads and connections, even if the sensor 12 is in close proximity to the measuring circuit 14.

The circuit discussed offers a solution to the challenges discussed above by using a 4-wire connection between the sensor 12 and the measuring circuit in order to circumvent the issues stemming from the sensor 12 to circuit 14 connection.

Figure 7:
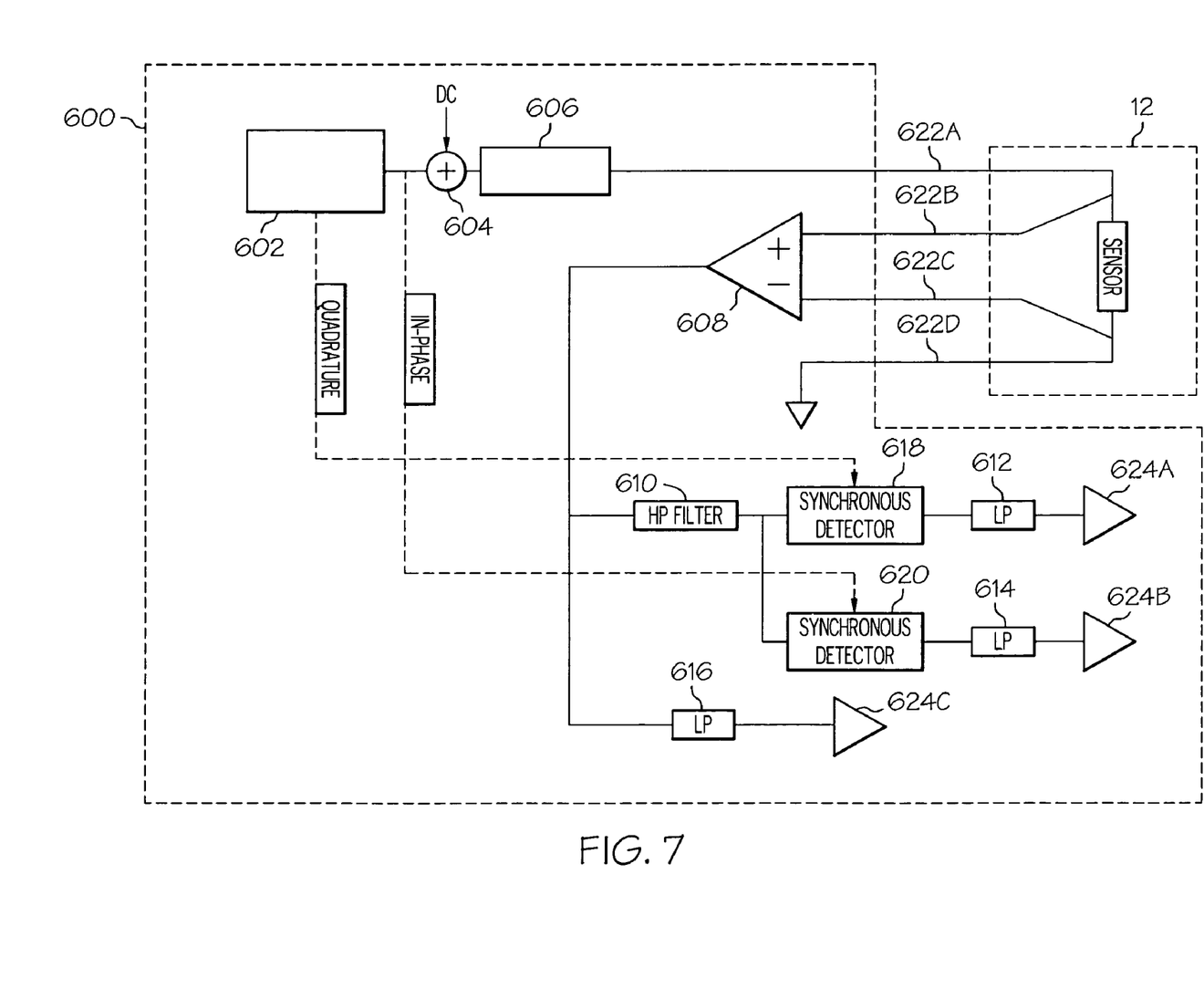
FIG. 7 is a block diagram of the measuring circuit of FIG. 1.

One aspect of a measuring circuit 14, generally designated 600 in FIG. 7, may include a sinewave oscillator 602 having a 90 degree reference, a DC voltage input 604, a voltage-to-current converter 606, instrumental amplifier 608, a high pass filter 610, low pass filters 612, 614, 616 and synchronous detectors 618, 620. The coilless sensor 12 may be connected to the circuit 600 by four lead wires 622A, 622B, 622C, 622D (ground). The circuit 600 may have analog outputs 624A, 624B, 624C.

The output of the sinewave oscillator 602 may be offset with DC voltage input 604 and, at converter 606, the voltage may be converted into a sinusoidal current signal. For example, the current signal may have a 40 mA peak to peak of amplitude. The current may flow through two of the lead wires 622A, 622D to the coilless sensor 12, which is modeled as a series ac resistance Rac and inductive reactance XI.

The instrumentation amplifier 608 may reject the voltage generated by current flowing through the lead resistance and may only measure voltage due to current flow through Rac and XI which combine in quadrature (i.e., the voltage from Rac is in phase with the current sinewave while the voltage from XI is leading the current sinewave by 90 degrees). This quadrature relationship allows the use of two synchronous detectors 618, 620 to separate and detect the two voltages by using in-phase and quadrature reference signals, thus producing two analog output signals 624A, 624B. One output is proportional to Rac and the other is proportional to XI.

The high pass filter 610 may be used ahead of the detectors to reject the DC component of the amplifier output. Conversely, the low pass filters 612, 614 on the output of the amplifier 608 reject the higher frequency AC components due to the fundamental of the current signal, and its harmonics, so as to produce outputs proportional to, respectively, Xl, and Rac. Also, the low pass filter 616 on the output of the amplifier 608 rejects most or all AC components and produces an output proportional to the DC resistance of the sensor 12. The DC resistance of the sensor 12 may be useful for temperature measurement in general. It can also be used for temperature compensation of the output of sensor 12, in ways known in the art.

Thus, circuit 600 uses a current source and amplifiers of sufficient sensitivity and amplification to result in sufficiently high output voltages for easy signal pick-up.

Those skilled in the art will appreciate that the circuit 14 as described in FIG. 7 with a 4-wire connection is useful to measure low values of inductance, resistance and impedance. Further, the proposed circuit may be modified to measure only the resistance, only the inductance, or both the resistance and inductance. One may opt to use, or not to use, the DC resistance measuring means. One may adapt and adjust various aspects of the circuit to fit a specific application, in ways which may be driven by cost, design and overall electronic integration.

The processor 16 is provided for calculating an amount of force F applied to the coilless sensor 12 based on the output signal from the measuring circuit 14. The processor 16 may be electrically coupled to the measuring circuit 14 and may receive an output signal from the measuring circuit 14 indicative of at least one of an amount of inductance, an amount of resistance and an amount of impedance of the coilless sensor 12. In one aspect, the processor 16 may include a computer that receives the output signal from the measuring circuit 14 and calculates a numeric force value (e.g., in Newtons). In another aspect, the processor 16 may be part of a brake controller (not shown), and the measuring circuit 14 then provides an analog or digital value useful for the feedback control of the brake system.

Accordingly, the disclosed coilless sensor 12 and associated system, including the measuring circuit 14 and processor 16, provide a low cost and robust method for measuring applied stress. Furthermore, the disclosed coilless sensor 12 may be adapted for use in various applications and designs because of its overall simplicity and relatively small size.

Although various aspects of the disclosed apparatus and system for measuring stress have been shown and described, modifications may occur to those skilled in the art upon reading the specification. The present application includes such modifications and is limited only by the scope of the claims.

What is claimed is:

1. A system for measuring stress comprising:
    a coilless sensor including at least one band of electrically conductive and magnetostrictive material, said band having a first end and a second end defining a gap therebetween;
    a measuring circuit electrically connected to said first and said second ends of said coilless sensor, said measuring circuit being configured to pass a current through said coilless sensor and measure at least one of an inductance, a resistance and an impedance of said coilless sensor in response to said current;
    a processor in electrical communication with said measuring circuit, said processor being configured to calculate an amount of stress being applied to said coilless sensor based upon said measured inductance, resistance and impedance; and
    an electric brake caliper assembly a caliper and a caliper housing, wherein said coilless sensor is positioned between said caliper and said caliper housing to measure a force being exerted by said caliper.

2. The system of claim 1 further comprising a first terminal connected to said measuring circuit and said first end of said coilless sensor and a second terminal connected to said measuring circuit and said second end of said coilless sensor.

3. The system of claim 1 wherein said stress being applied to said coilless sensor is applied through a stress transmitting member having a shape, and wherein said band is shaped to generally match said shape of said stress transmitting member.

4. The system of claim 1 wherein said band is shaped as an open ring.

5. The system of claim 1 wherein a length of said gap is less than about 50 percent of a length of said band.

6. The system of claim 1 wherein a length of said gap is less than about 5 percent of a length of said band.

7. The system of claim 1 wherein said band has a generally rectangular cross-section.

8. The system of claim 1 wherein said band is shaped as an open ring and has a generally rectangular cross-section having an aspect ratio of about 1 to about 10.

9. The system of claim 1 wherein said band is farmed from a nickel/iron alloy.

10. The system of claim 1 wherein said band is shaped such that a length of said gap is less than a length of said band.

11. The system of claim 1 wherein said measuring circuit is configured to pass an oscillating current through said coilless sensor.

12. The system of claim 1 wherein said measuring circuit is configured to generate a voltage signal in response to said measured inductance, resistance and impedance.

13. The system of claim 12 wherein said measuring circuit includes an amplifier adapted to amplify said generated voltage.

14. A system for measuring stress comprising:
    a coilless sensor including at least one band of electrically conductive and magnetostrictive material, said band having a first end and a second end defining a gap therebetween;
    a measuring circuit electrically connected to said first and said second ends of said coilless sensor, said measuring circuit being configured to pass a current through said coilless sensor and measure at least one of an inductance, a resistance and an impedance of said coilless sensor in response to said current;
    a processor in electrical communication with said measuring circuit, said processor being configured to calculate an amount of stress being applied to said coilless sensor based upon said measured inductance, resistance and impedance; and
    wherein said band is shaped as an open, washer-shaped ring and has a generally rectangular cross-section having an aspect ratio of about 0.1 to about 1.

15. A system for measuring stress comprising:
    a coilless sensor including at least one band of electrically conductive and magnetostrictive material, said band having a first end and a second end defining a gap therebetween;
    a measuring circuit electrically connected to said first and said second ends of said coilless sensor, said measuring circuit being configured to pass a current through said coilless sensor and measure at least one of an inductance, a resistance and an impedance of said coilless sensor in response to said current;
    a processor in electrical communication with said measuring circuit, said processor being configured to calculate an amount of stress being applied to said coilless sensor based upon said measured inductance, resistance and impedance; and
    wherein said coilless sensor includes at least two of said bands aligned concentrically.

16. The system of claim 15 wherein said at least two concentric bands are connected in parallel.

17. The system of claim 15 wherein said at least two concentric bands are connected in series.

18. A system for measuring stress comprising:
    a coilless sensor including at least one band of electrically conductive and magnetostrictive material, said band having a first end and a second end defining a gap therebetween;
    a measuring circuit electrically connected to said first and said second ends of said coilless sensor, said measuring circuit being configured to pass a current through said coilless sensor and measure at least one of an inductance, a resistance and an impedance of said coilless sensor in response to said current;

a processor in electrical communication with said measuring circuit, said processor being configured to calculate an amount of stress being applied to said coilless sensor based upon said measured inductance, resistance and impedance; and wherein said measuring circuit is connected to said coilless sensor with at least four leads, two of said leads being connecting to said first end of said coilless sensor and another two of said leads being connecting to said second end of said coilless sensor, wherein one of said leads connected to said first end is configured to pass an oscillating signal to said coilless sensor, and wherein one of said leads connected to said second end is configured to connect said coilless sensor to ground, and wherein the other of said connected leads are connected differentially to generate a voltage signal in response to said measured inductance, resistance and impedance.

* * * * *